United States Patent [19]

Seki et al.

[11] Patent Number: 5,095,419

[45] Date of Patent: Mar. 10, 1992

[54] METHOD OF DEFINING HOLE POSITION OF PUNCH MOUNTING PART

[75] Inventors: Masaki Seki; Masatoshi Yoshizaki, both of Tokyo; Takeshi Hosono; Shizuaki Hayanagi, both of Yamanashi, all of Japan

[73] Assignee: Fanuc Ltd., Yamanashi, Japan

[21] Appl. No.: 381,408

[22] PCT Filed: Nov. 15, 1988

[86] PCT No.: PCT/JP88/01151

§ 371 Date: Jul. 14, 1989

§ 102(e) Date: Jul. 14, 1989

[87] PCT Pub. No.: WO89/04732

PCT Pub. Date: Jun. 1, 1989

[30] Foreign Application Priority Data

Nov. 18, 1987 [JP] Japan ................. 62-291253

[51] Int. Cl.$^5$ .................. G05B 9/02; G05B 19/18; B21D 37/20; B21D 35/00
[52] U.S. Cl. ................. 364/188; 364/474.24
[58] Field of Search ................. 364/188-192, 364/474.22-474.27

[56] References Cited

U.S. PATENT DOCUMENTS

| | | | |
|---|---|---|---|
| 3,725,652 | 5/1973 | Konvalina | 364/191 |
| 3,860,803 | 8/1970 | Levine | 364/191 |
| 4,096,563 | 6/1978 | Slawson | 364/192 |
| 4,517,649 | 5/1985 | Kitagawa | 364/474.27 |

FOREIGN PATENT DOCUMENTS 00137129 5/1987 Japan.

OTHER PUBLICATIONS

"Progressive Die and other Small Metal Dies" 8/18/83, pp. 195-214.

*Primary Examiner*—Jerry Smith
*Assistant Examiner*—Jim Trammell
*Attorney, Agent, or Firm*—Staas & Halsey

[57] ABSTRACT

The present invention relates to a method of defining a hole position of a punch mounting part in a progressive mold. Position of the holes (PH1-PH3) for parts such as bolts which mount punches on a plate (PLT) are defined, the positions of the part holes (PH1-PH3) are stored in correlation with punch shapes (DF1-DF3), and the part hole positions are moved in association with movement of the punch shapes.

5 Claims, 7 Drawing Sheets

| T1 | T2 | | T3 | | |
|---|---|---|---|---|---|
| ARTICLE SHAPE INPUT | BLANK LAYOUT | | STRIP LAYOUT | | |
| NEW INPUT | NEW CREATION | MATERIAL SET | NEW CREATION | PILOT HOLE | |
| | | | | SET | DELETE |
| INPUT | STAGE EXPANSION | | SHAPE | | |
| | ONE STAGE | MULTI-STAGE | CREATE | REVICE | UTILIZE |
| | PILOT HOLE | | | | |
| | SET | DELETE | | | |
| | PLATE WIDTH | | OVER-LAPPING VIEW | SKELETON VIEW | SHAPE OFFSET |
| | SET | DELETE | | | OVERALL | PARTIAL |
| | COMPUTATION | | COMPUTATION | | |
| | YIELD | UNIT PRICE | LOAD CENTER | EXTRACTION LOAD | PERI-METER |
| | SHAPE SELECTION | MOVE | ROTATE | INVERT | COPY | DELETE |

T12

| T13 | | T14 |
|---|---|---|
| PART MENU | | LIST MENU |
| MOUNTING BOLT | PILOT PIN | PLATE COMPOSI-TION TABLE |
| GUIDE PIN | BUMPER LOCK | TOOL TABLE |
| DWELL PIN | LIFTER PIN | PART HOLE TABLE |
| STRIPPER HANG-ING BOLT | WC START POINT | HOLE TYPE TABLE |
| | | |
| | | |
| | | |
| | | |
| | MIS'C | |

T10

| A | B | C | D | E | F |
|---|---|---|---|---|---|
| G | H | I | J | K | L |
| M | N | O | P | Q | R |
| S | T | | | | |

| | | | T4 | | PLATE DEVISION DELETE | | T5 | T6 | T7 |
|---|---|---|---|---|---|---|---|---|---|
| | MOLD CONCEPTION | | | | | | MACHING DATA OUTPUT | DRAWING OUTPUT | LIST OUTPUT |
| | PLATE DESIGN | | | | | | HOLE DATA | COORDINATE PRINTOUT MODE | DATA OUTPUT |
| NEW CREATION | SET | MOVE | INPUT | OUTPUT | LLIST | PLATE DEVISION | | | |
| FIGURE DESIGN | | | | | HOLE POSITION | | | SET | DATA INPUT |
| PLATE SELECT | ALL | DESIG-NATE | CANCEL | WCSTART POINT | SET | VERIFY | CANCEL | | |
| SHAPE OFFSET | | | | | ONE POINT | TWO POINTS | FOUR POINTS | OUTPUT ORDER SET | DRAWING PRINTOUT |
| OVERALL | PARTIAL | | | | | | | | |
| HOLE TYPE DESIGN | | | | | TWO POINTS | TWO POINTS | CENTER POINT | SHAPE DATA | |
| SET | DELETE | INPUT | OUTPUT | LLIST | | | | | |
| PART HOLE DESIGN | | | | | MI | | PATERN | | ARTICLE DATA OUTPUT |
| SET | DELETE | INPUT | OUTPUT | LLIST | | | | | |
| PATERN DESIGN | | | | | SECTIONAL VIEW | | | | DATA SET |
| SET | DELETE | INPUT | OUTPUT | LLIST | CREATE | DELETE | | | |

T15 — PUNCH HOLE — T9 — T8

| | DRAFTING PROCESSING | | | | | | |
|---|---|---|---|---|---|---|---|
| DRAWING MENU | | | | FLAME/TITLE | | | |
| ARTICLE VIEW | SHAPE SELECTION | NEW CREATION | | NOVEL CREATION | MOVE | CREATE | INPUT | OUTPUT |
| BLANK LAYOUT | | | | | | | |
| STRIP LAYOUT | DIMENSIONS ENTRY | | | | | | |
| OVERLAPPING VIEW | VERIFY | DELETE | SET | | | | |
| SKELETON VIEW | | | | | | ENTRY | CENTER LINE |
| PLATE PLAN VIEW | | | | | | | |
| SECTIONAL VIEW | | | | | | REFERENCE POINT SET | AUTOMATIC DIMENTION ENTRY |

T11

| 7 | 8 | 9 | × | ↘ | ↑ |
|---|---|---|---|---|---|
| 4 | 5 | 6 | + | — | |

FIG. 7(b)
PRIOR ART

METHOD OF DEFINING HOLE POSITION OF PUNCH MOUNTING PART

BACKGROUND OF THE INVENTION

1. Field of the Invention

This invention relates to a method of defining the hole position of a part for mounting a punch in design of a progressive mold.

2. Description of the Related Art

Figure 6:
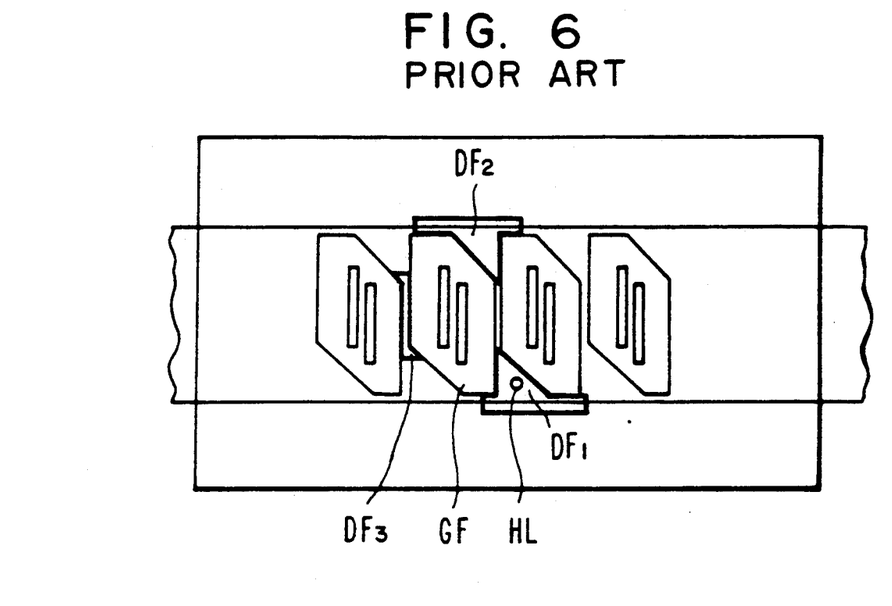
FIG. 6 is a schematic view illustrating the background of the invention.

In a CAD/CAM system for designing a progressive mold, article arrangement, number of stages, pitch and the like are designed (blank layout processing) conversationally based on an entered article shape, as shown in FIG. 6, then different shapes such as the shapes of a punch and die (DF1-DF3) are designed (strip layout processing). Thereafter, the number and size of plates constituting the progressive mold are defined, the different shapes into which the plates are to be machined and the part holes to be machined are specified (mold conception processing), and finally machining data are outputted for each plate.

A punch and die have a male-female relationship. Therefore, if the shape of one of them is defined, usually the shape of the other is obtained by applying offset processing. Accordingly, punch shape machining data usually are created after the die shape machining data.

Figure 7A:
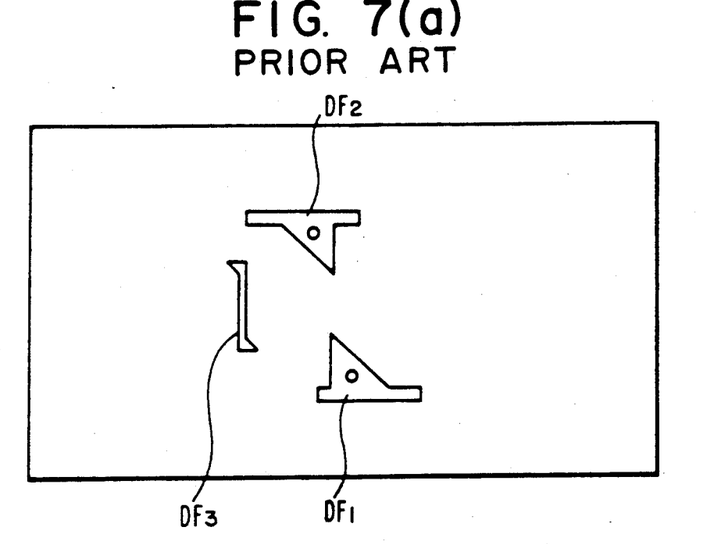
FIG. 7(a) and 7(b) are schematic views respectively illustration positions of die shapes and punch shapes of a punch blank.
Figure 7B:
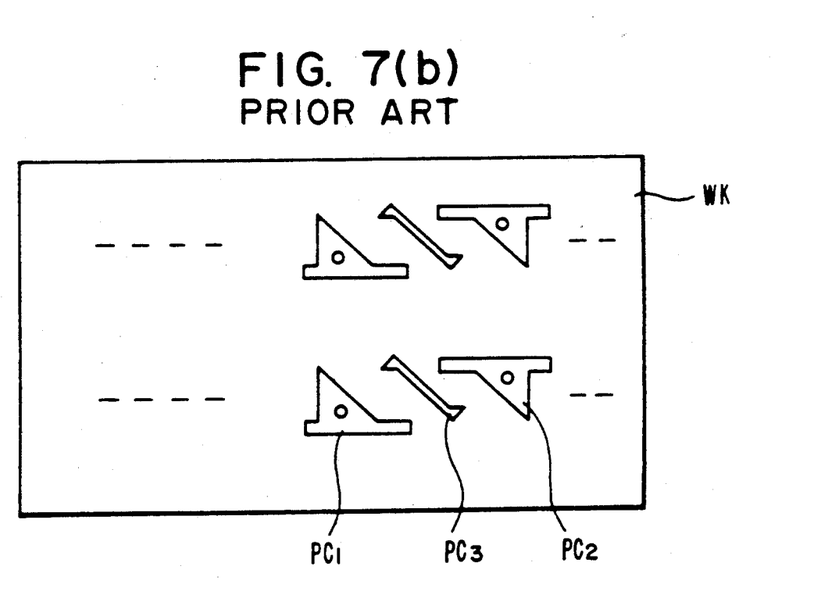

However, punch shapes generally are gathered together and subjected to wire-cut machining in such a manner that many punches are obtained from one blank, so as to achieve excellent machining efficiency, without leaving the arrangement of the die shapes as is. FIG. 7(a) is a view showing the positions of die shapes, and FIG. 7(b) is a view showing the arrangement of punch shapes PC1-PC3 in a punch blank WK, these corresponding to the die shapes DF1-DF3, respectively. Therefore, when the punch machining data are created, an offset is applied to the die shapes DF1-DF3 to obtain the punch shapes, and the punch shapes are subjected to translation, rotation, copying, inversion, etc. An arrangement can be adopted in which the punch shapes are obtained by applying the offset after the die shapes are translated, rotated, inverted, etc.

Figure 8:
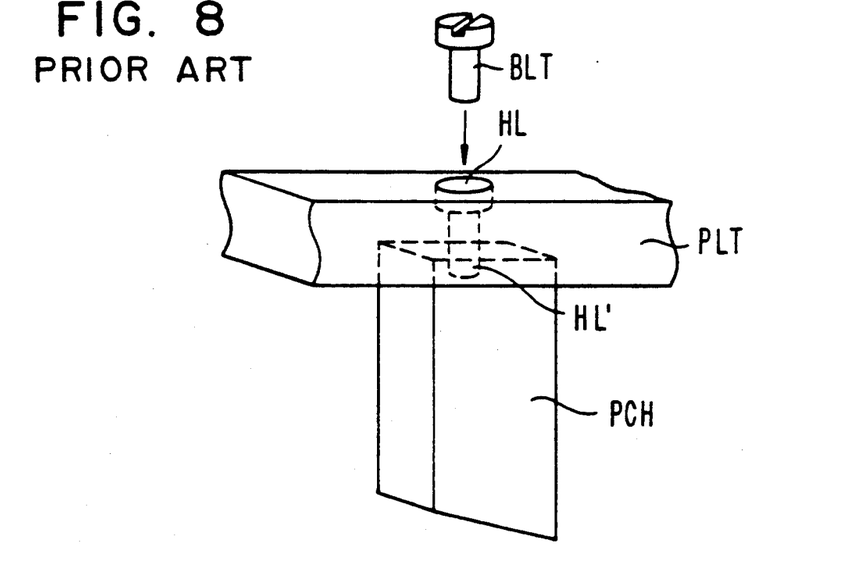
FIG. 8 is a perspective view illustrating a known punch, plate and bolt.

Ordinarily, with a progressive mold, a punch PCH is mounted on a prescribed plate PLT by a bolt BLT, as shown in FIG. 8. Consequently, it is required that holes HL, HL' for mounting the bolt BLT be machined in the plate PLT and in the head of the punch PCH. In designing a part hole in mold conception, holes for mounting bolts, pins or the like fastening the plates together are defined, and the position of the hole HL (FIG. 8) of the part (bolt) BLT for mounting the punch PCH on the plate PLT is defined.

The hole position of the punch mounting bolt BLT in the plate PLT and the hole position in the head of the punch PCH must coincide accurately when the punch is mounted. To this end, when the die shape (punch shape) is moved, as mentioned above, in the creation of the punch machining data, the hole position of the punch mounting part (bolt) is also moved to create the punch machining data, and the part hole HL in the plate for mounting the punch and the part hole HL' machined in the head of the punch are made to precisely coincide.

According to the conventional method, however, the die shape (punch shape) and the punch mounting part hole are moved separately. As a consequence, it is necessary to separately calculate and enter the part hole position after the punch shape is moved. This is a troublesome operation. In addition, there are cases where the positions of the part hole HL in the plate and the part hole HL' in the head of the punch fail to accurately coincide because of calculation error.

SUMMARY OF THE INVENTION

Accordingly, an object of the present invention is to provide a method of defining a hole position of a punch mounting part, in which it is unnecessary to separately move a die shape (punch shape) and a punch mounting part hole.

Another object of the present invention is to provide a method of defining a hole position of a punch mounting part, in which punch mounting part hole positions in a plate and punch head can be made to accurately coincide.

The invention provides a method of defining a hole position of a punch mounting part in a CAD/CAM system for performing progressive mold design. A hole position of a part which mounts a punch on a plate is defined, the part hole position data are stored in memory in correlation with punch shape data, the part hole position is moved in association with movement of the punch shape, and NC data for punch machining are created based on punch shape position and hole position after movement.

DETAILED DESCRIPTION OF THE PREFERRED EMBODIMENTS

Figure 1:
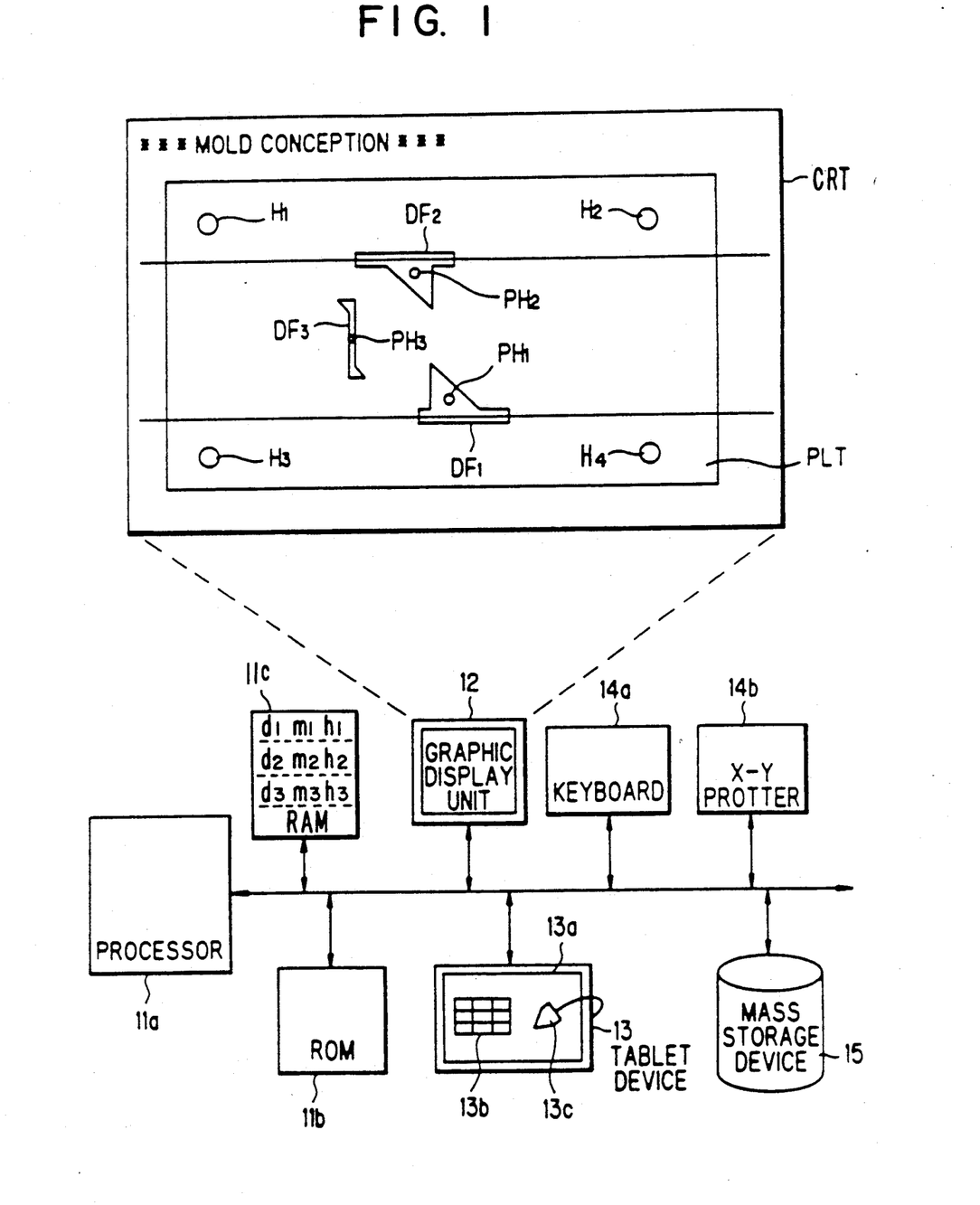
FIG. 1 is a block diagram of a CAD/CAM system for progressive mold design to which the present invention is applied.

FIG. 1 is a block diagram of a CAD/CAM system for progressive mold design to which the present invention is applied.

Numeral 11a denotes a processor, 11b a ROM, 11c a RAM, 12 a graphic display unit, 13 a tablet device, 14a a keyboard, 14b an X-Y plotter, and 15 a mass storage device which stores various data files for progressive mold design, as well as automatically created NC information, etc.

CRT represents a display screen, DF1-DF3 die shapes (or punch shapes), H1-H4 part holes, and PH1-PH3 part holes of punch mounting parts for mounting a punch on a plate PLT.

A menu table 13b is affixed to a tablet surface 13a of the tablet device 13. By using a tablet cursor 13c to select prescribed items written on the menu chart, various items and data can be entered.

Figure 2A:
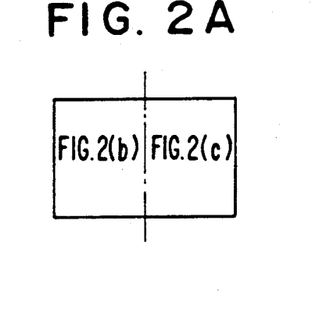
FIGS. 2A-2C illustrate a menu chart of the CAD/CAM system of FIG. 1, with FIG. 2A showing the overall layout, and 2B showing two parts of the chart (due to size limitations of the figures)
Figure 2B:
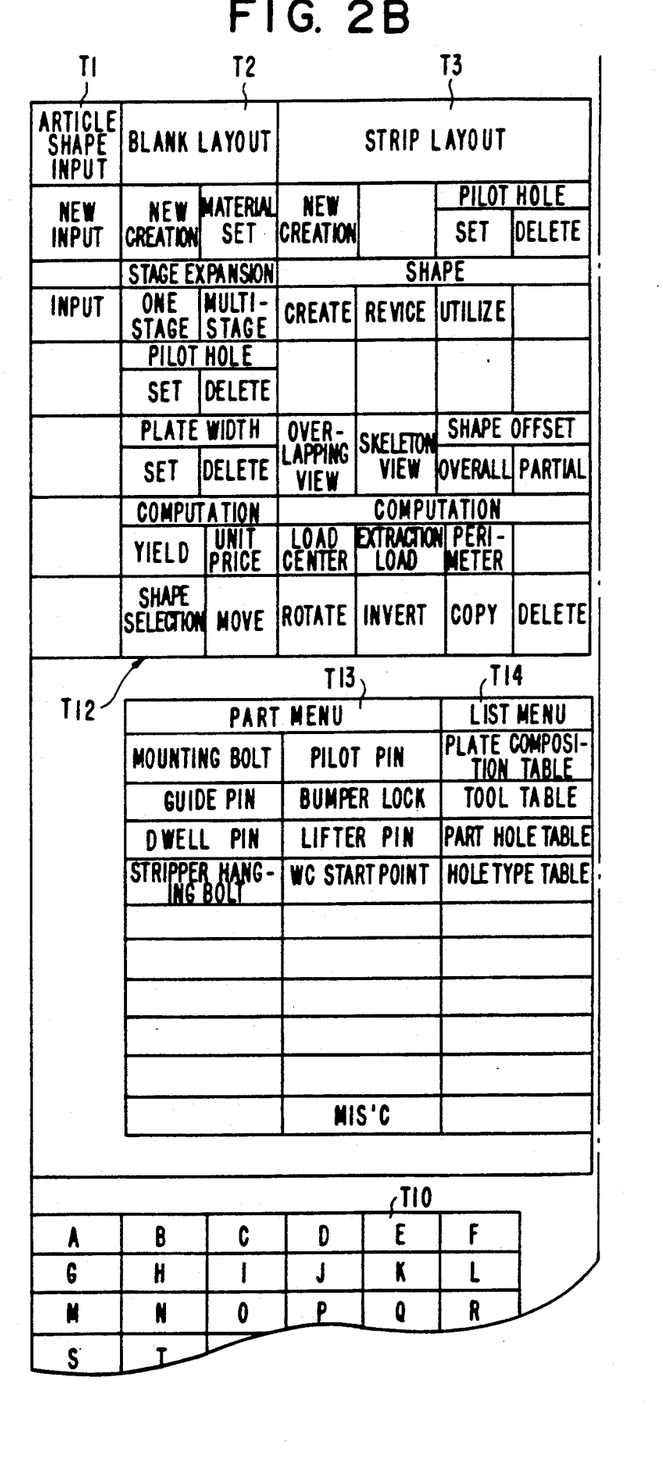
Figure 2C:
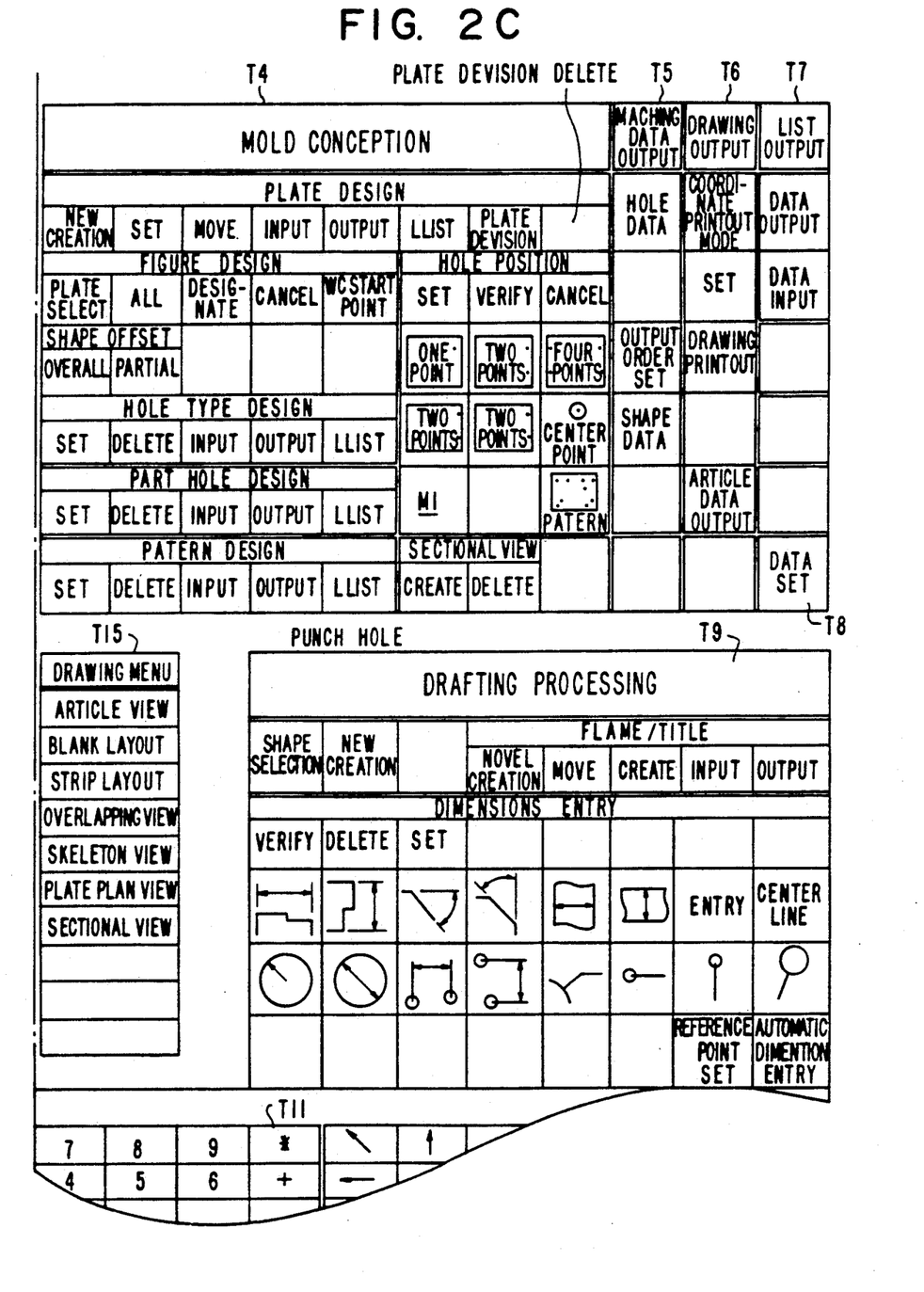

FIG. 2A is an overall view of the menu chart, as represented by FIGS. 2B and 2C. The menu is provided with an article shape input section T1, a blank layout section T2, s strip layout section T3, a mold conception section T4, a machining data output section T5, a drawing output section T6, a list output section T7, a data setting section T8, a drafting processing section T9, an alphabet/symbol input section T10, a numerical value/-mold shape input section T11, a shape converting section T12, a part menu section T13, a list menu section T14, and a drawing menu section T15.

Figure 3:
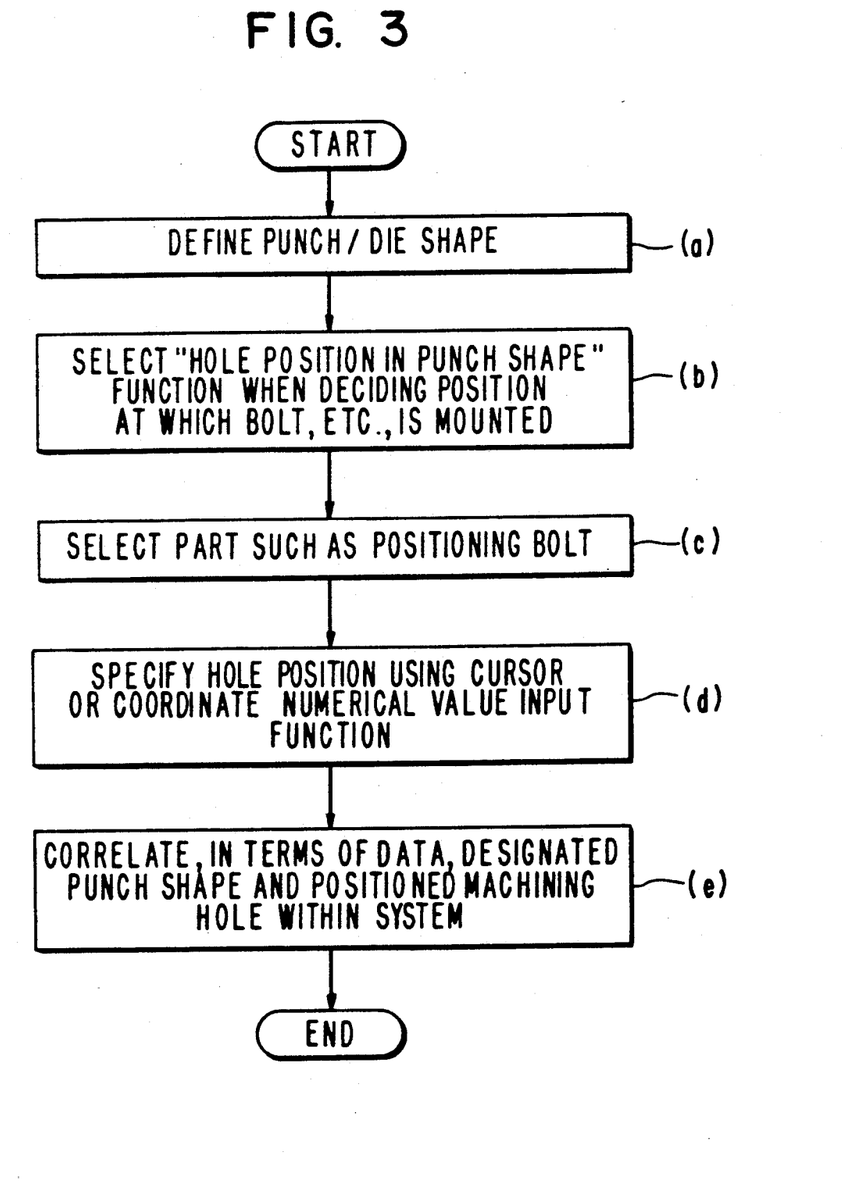
FIG. 3 is a flowchart of processing according to the invention.
Figure 4:
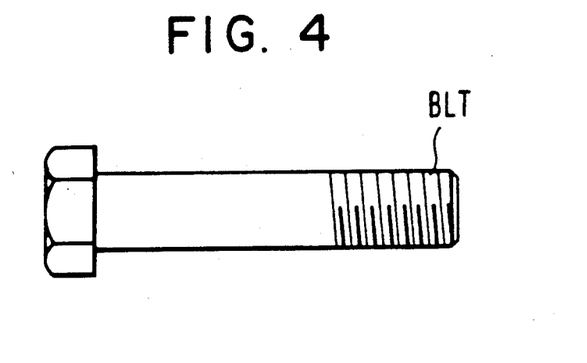
FIGS. 4 and 5 are views for describing part hole machining information.
Figure 5:
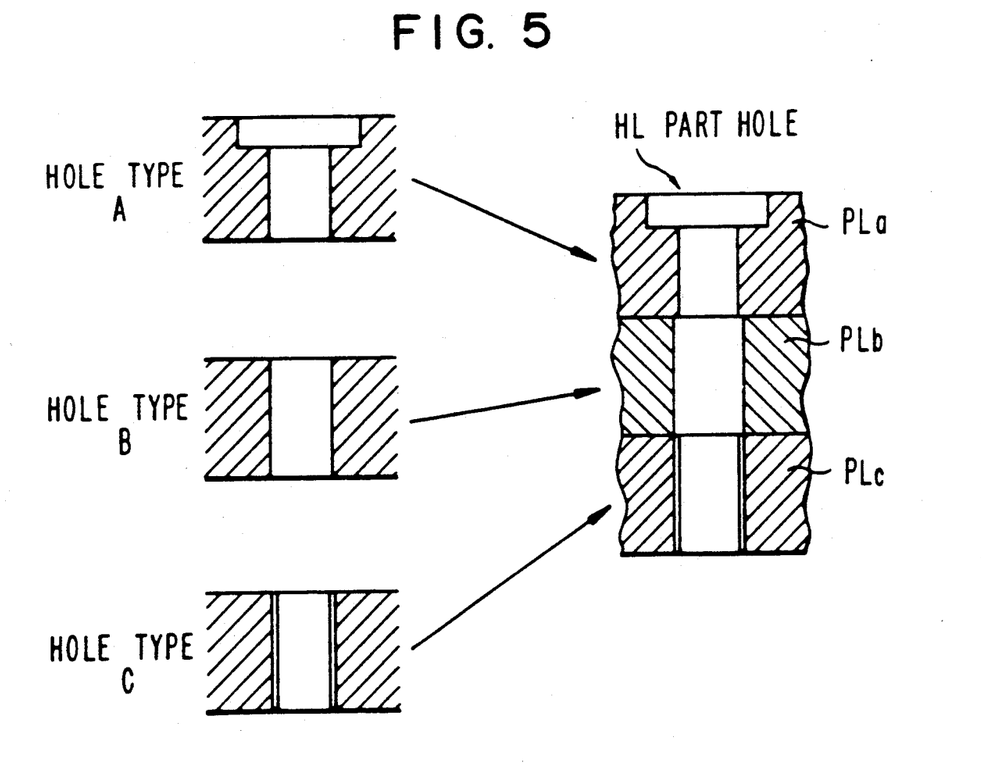

The mold conception section T4 is provided with a "HOLE POSITION IN PUNCH SHAPE" item M1 for correlating a punch mounting part hole with a predetermined punch shape FIG. 3 is a flowchart of processing according to the method of defining the hole position of a part for mounting a punch in accordance with the invention, and FIGS. 4 and 5 are views for describing part hole machining information. The invention will now be described in accordance with FIGS. 1 through 4.

It will be assumed that part hole machining information has been registered in the mass storage device 15 to correspond to the parts (bolts, pins, etc.) mounted on the plate. For example, let PT1 represent the part name of a bolt BLT shown in FIG. 4, and let A, B and C represent the names of the types of holes in mold plates PLa-PLc (see FIG. 5) to which the part is mounted. Then, assume that the hole type A is obtained by center counter-boring to depth $D_{11}$ by a tool of diameter $A_1$, drilling (lower hole machining) to depth $D_{12}$ by a tool of diameter $B_1$, and then lower hole machining to depth $D_{13}$ by a drilling tool of diameter $C_1$. Further, assume that the hole type B is obtained by center counter-boring to depth $D_{21}$ by a tool of diameter $A_2$ and then drilling (lower hole machining) to depth $D_{22}$ by a tool of diameter $B_2$. In addition, assume that the hole type C is obtained by center counter-boring to depth $D_{31}$ by a tool of diameter $A_3$, drilling (lower hole machining) to depth $D_{32}$ by a tool of diameter $B_3$, and finally machining to depth $D_{33}$ by a drilling tool of diameter $E_3$. In such case, the machining data will be as follows:

"PT1, A, B, C, 1 or 0; (where 1 signifies machining from the front side of a plate, and 0 signifies machining from the rear side)
| | | |
|---|---|---|
| hole type A, | counter-boring tool, | diameter $A_1$, depth $D_{11}$ |
| | drilling tool, | diameter $B_1$, depth $D_{12}$ |
| | drilling tool, | diameter $C_1$, depth $D_{13}$ |
| hole type B, | counter-boring tool, | diameter $A_2$, depth $D_{21}$ |
| | drilling tool, | diameter $B_2$, depth $D_{22}$ |
| hole type C, | counter-boring tool, | diameter $A_3$, depth $D_{31}$ |
| | drilling tool, | diameter $B_3$, depth $D_{32}$ |
| | tapping tool, | diameter $E_3$, depth $D_{33}$" |

(a) Blank layout design is carried out based on the entered article shape. Next, in strip layout design, the different shapes, such as the shapes of the dies (punches) DF1-DF3 are defined at predetermined positions of the plate, and these are stored in the RAM 11c as data d1-d3. The defined die shapes (punch shapes) $DF_1$-$DF_3$ are displayed on the display screen (see FIG. 1).

Next, in mold conception design, the positions of the part holes H1-H4, in which the bolts, pins, etc., that fasten the plates of the progressive mold together are mounted, are defined, then the hole positions PH1-PH3 of the parts (bolts) for mounting the punches on the plate are defined.

In this case, hole machining information m1-m3 regarding the parts for mounting the punches and the hole position data h1-h3 are stored in the RAM 11c in correlation with the punch shape data d1-d3 by means of the following steps:

(b) In defining the hole positions of the punch mounting parts, the "PUNCH SHAPE HOLE POSITION" item M1 in the menu chart 13b (see FIG. 2) is selected. By selecting item M1, an inquiry appears on the display screen with regard to the shapes DF1-DF3 of the punches mounted by the punch mounting parts. Therefore, a prescribed punch shape is selected by the graphic cursor.

(c) Thereafter, a part name listed in the part menu T13 of the menu chart 13b is selected and the punch mounting part (e.g., a mounting bolt) is entered. In response, the processor 11a reads the part hole machining information regarding this mounting bolt out of the mass storage device 15 and stores this information in the RAM 11c to correspond to the punch shape data di designated at step (b).

(d) Next, the hole position of the punch mounting part is entered using the graphic cursor or the keyboard.

(e) By repeating the foregoing operation for each punch shape, the processor 11a stores, in correlated form, the designated punch shapes d1-d3, the hole machining information m1-m3 regarding the punch mounting parts, and the part hole position data h1-h3.

Thereafter, the different shapes and part holes machined in each plate are specified and finally machining data are outputted for each plate.

In creating the punch machining data, the punch shapes DF1-DF3 are translated, rotated, copied, inverted, etc., in such a manner that many punches are obtained from one blank (see FIGS. 7A and 7B).

In such case, movement of punch shape is performed by selecting the punch shape with the graphic cursor, entering translation, rotation, inversion, copy or delete using the shape conversion item T12 of the menu chart, and designating the position to which the punch shape is to be moved using the graphic cursor or keyboard. It should be noted that movement of punch shape is carried out by obtaining a coordinate transformation matrix conforming to the type and amount of movement, and applying the coordinate transformation matrix to the punch shape data di.

In the present invention, the arrangement is such that the hole position of the punch mounting part is moved in association with the movement of the punch shape. In other words, the arrangement is such that the coordinate transformation matrix is applied to the punch mounting part hole position data hi stored in the RAM 11c, whereby the part hole is moved in association with the movement of punch shape.

As a result, the operation in which the hole position of the punch mounting part is moved following movement of the punch shape, as in the prior art, is no longer required.

In accordance with the invention, a hole position of a part which mounts a punch on a plate is defined. In making the definition, the part hole position is stored in memory in correlation with punch shape data, and the part hole position is moved in association with movement of the punch shape. As a result, operation is facilitated since the punch shape and the hole of the punch mounting part need not be moved separately. In addition, even if machining is performed upon moving the punch shape, the position of the part hole machined in the plate and the position of the part hole machined in the punch head can be made to precisely coincide.

I claim:

1. A method of defining a hole position of a punch mounting part in a CAD/CAM system for performing progressive mold design by performing blank layout based on an entered article shape, then defining different shapes such as punch shapes in a strip layout, and thereafter specifying different shapes and part holes machined in each plate, comprising the steps of:

defining a part hole position corresponding to the punch shape, when defining a hold position of a part which mounts a punch on a plate;

moving the part hole position in accordance with movement of the punch shape; and after the part hole position of the part which mounts the punch is defined, entering (i) the fact that the hole is a hole for the part which mounts the punch, (ii) a part name of the part which mounts the punch, (iii) the shape of the punch mounted by said part, and (iv) the part hole position.

2. A method of defining a hole position of a punch mounting part according to claim 1, further comprising storing part hole machining information to correspond to each part name, obtaining part hole machining information conforming to each entered part name, and storing hole position data of the part which mounts the punch and said part hole machining information in a memory to correspond to said inputted punch shape data.

3. A method of defining a hole position of a punch mounting part according to claim 2, further comprising applying a coordinate transformation, for moving the punch stage to a predetermined position, to said punch stage and to a hole position correlated with said punch shape, thereby moving the part hole position in association with movement of the punch shape.

4. A method of defining a hole position of a punch mounting part according to claim 3, further comprising creating NC data for punch machining based on punch shape position, hole position, punch shape data and hole machining information after movement.

5. A method of defining a hole position of a punch mounting part in a CAD/CAM system for performing progressive mold design by performing blank layout based on an entered article shape, then defining different shapes such as punch shapes in a strip layout, and thereafter specifying different shapes and part holes machined in each plate, comprising the steps of:

defining a hole position of a part which mounts a punch on a plate by entering (i) the fact that the hole is a hole for the part which mounts the punch, (ii) a part name of the part which mounts the punch, and (iii) the hole position of the part, defining the hole position as a part hole position together with the punch shape when said fact is entered; and moving the part hole position in accordance with the movement of the punch shape.

* * * * *